US008799253B2

(12) United States Patent
Valliani et al.

(10) Patent No.: US 8,799,253 B2
(45) Date of Patent: Aug. 5, 2014

(54) PRESENTING AN ASSEMBLED SEQUENCE OF PREVIEW VIDEOS

(75) Inventors: Jamil Valliani, Kirkland, WA (US); Ken Lo, Toronto (CA)

(73) Assignee: Microsoft Corporation, Redmond, WA (US)

( * ) Notice: Subject to any disclaimer, the term of this patent is extended or adjusted under 35 U.S.C. 154(b) by 945 days.

(21) Appl. No.: 12/492,875

(22) Filed: Jun. 26, 2009

(65) Prior Publication Data

US 2010/0332497 A1 Dec. 30, 2010

(51) Int. Cl.
*G06F 17/30* (2006.01)
(52) U.S. Cl.
USPC .......................... 707/706; 707/707; 707/723
(58) Field of Classification Search
None
See application file for complete search history.

(56) References Cited

U.S. PATENT DOCUMENTS

| | | | |
|---|---|---|---|
| 6,263,507 B1 | 7/2001 | Ahmad et al. | |
| 6,363,390 B1 | 3/2002 | Shapiro et al. | |
| 6,954,900 B2 | 10/2005 | Yu et al. | |
| 2002/0194197 A1 | 12/2002 | Flank | |
| 2003/0123850 A1 | 7/2003 | Jun et al. | |
| 2003/0163815 A1* | 8/2003 | Begeja et al. | 725/46 |
| 2005/0165743 A1 | 7/2005 | Bharat et al. | |
| 2005/0257240 A1 | 11/2005 | Faulkner et al. | |
| 2005/0262073 A1* | 11/2005 | Reed et al. | 707/4 |
| 2006/0106764 A1 | 5/2006 | Girgensohn et al. | |
| 2007/0198353 A1* | 8/2007 | Behringer et al. | 705/14 |
| 2007/0203942 A1* | 8/2007 | Hua et al. | 707/104.1 |
| 2007/0244900 A1* | 10/2007 | Hopkins et al. | 707/10 |
| 2008/0033806 A1* | 2/2008 | Howe et al. | 705/14 |
| 2008/0086688 A1* | 4/2008 | Chandratillake et al. | 715/719 |
| 2008/0183672 A1* | 7/2008 | Canon et al. | 707/3 |
| 2009/0019085 A1 | 1/2009 | Abhyanker | |

OTHER PUBLICATIONS

Micheal G. Christel, Multimedia Abstractions for a Digital Video Library, In Proceedings of ACM Digital Libraries '97 Conference, Philadelphia, PA, pp. 21-29, Jul. 1997, http://www.informedia.cs.cmu.edu/documents/Acm-dl.pdf.
Amit Agarwal, Windows Live Search Tricks you may not know about, Aug. 29, 2008, http://www.labnol.org/internet/search/windows-live-search-tricks-hacks/4337/.
Mr. Wu Xiao, Threading and Auto-Documentary in News Videos, Department of Computer Science, City University of Hong Kong, Sep. 26, 2005, http://www.cs.cityu.edu.hk/seminars/sem433-2005-2006-no5.pdf.
Live Search Overview, Microsoft, Sep. 12, 2006, http://74.125.77.132/search?q=cache:mwAoEHBOhLgJ:www.microsoft.com/presspass/newsroom/msn/docs/ LiveSearchPPT.ppt+Live+Search+Overview&cd=3&hl=en&ct=clnk.
Mark Woan, Image Thumbnail Preview in DataGridView, The Code Project, Sep. 16, 2008, http://www.codeproject.com/Kb/grid/ImagePreviewDataGridView.aspx.

* cited by examiner

*Primary Examiner* — Syed Hasan
(74) *Attorney, Agent, or Firm* — Dave Ream; Doug Barker; Micky Minhas

(57) ABSTRACT

Methods and computer-readable media are provided for presenting on a website a single video stream that includes a plurality of preview videos directed toward a particular category of interest to a user. Informational items, such as news stories, that have associated preview videos are selected from a database. A preview video for each of the informational items is then algorithmically determined using, for instance, a ranking system. The ranking system may be based on a variety of heuristics, which may indicate popularity, importance, reliability, or relevance of the specific preview video. The single video stream is presented on the website such that the preview videos can be viewed as an assembled sequence of videos. Once an indication has been received to initiate play of the video stream, the preview videos play without requiring any user interaction.

18 Claims, 7 Drawing Sheets

FIG. 3.

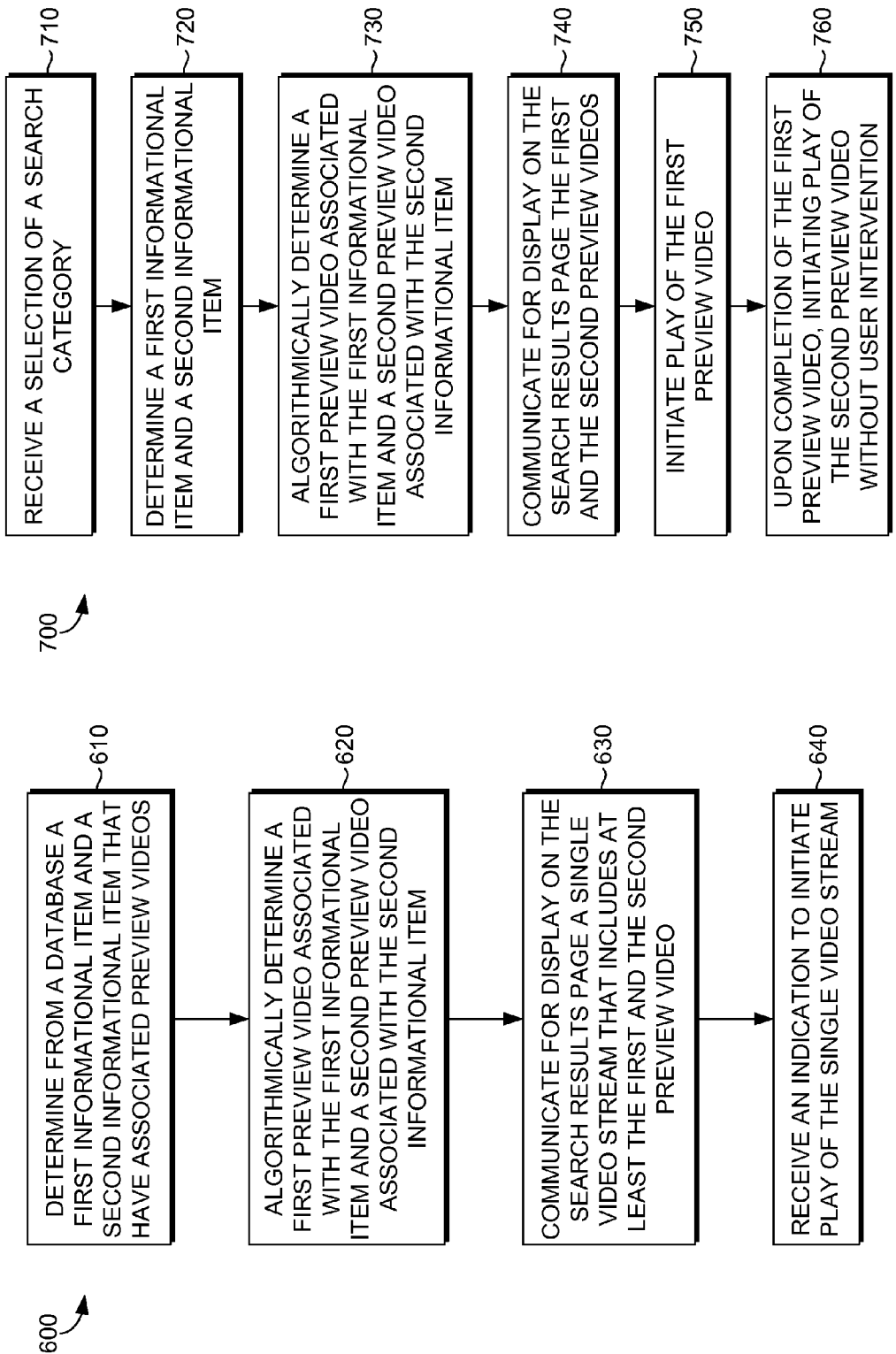

PRESENTING AN ASSEMBLED SEQUENCE OF PREVIEW VIDEOS

BACKGROUND

Typically, when a user enters a website that is focused on providing current information on various topics, such as news, entertainment, sports, etc., a user is only able to view articles, videos, and images from a single source, such as a single news source. Further, on these types of news websites and other websites that provide users with current information on various topics, such as search websites, users may have to select individual videos, if there are any, in order for the video to play. This may become cumbersome if there are several news stories on various topics and videos associated with each story. There is currently no easy way for a user to view an assembled sequence of videos that summarize all of the top stories, for instance, at that current time. Additionally, while a single type of information, such as an article, video, or image may be presented on a website for a user to view, many more may be available but are not presented to the user at the time that the user is viewing a video, for example, that is associated with a particular topic. For instance, various angles of a particular news story may be presented on a website in different forms, such as images, articles, audio clips, and videos, but these various media forms are often not easily accessible to a user.

SUMMARY

Embodiments of the present invention relate to methods and computer-readable media for, among other things, allowing a user to view an assembled sequence of preview videos that have been selected based on a chosen category, such as health, entertainment, top stories, sports, science, technology, politics, United States, world, etc. Once a category has been chosen, informational items, such as news stories, may be algorithmically determined as being the most relevant, most important, or most popular. A preview video for each informational item is then algorithmically determined based on one or more heuristics. The preview videos may be displayed on a search page, and once initiated, are sequentially played without user interaction such that the user is not required to select the individual videos. This allows for a user to view a preview of a plurality of videos, which provides the user with a summary of the most relevant, popular, or important stories of the day or of the moment. In one instance, the user may also be provided with related content, such as images, articles, other videos, or audio clips while each preview video is played.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein:

FIG. 3 is an illustrative screen display of a search results page having a single video stream that includes a plurality of preview videos, in accordance with another embodiment of the present invention;

FIG. 6 is a flow diagram of a method for presenting on a search results page a single video stream that includes a plurality of preview videos, in accordance with an embodiment of the present invention;

FIG. 7 is a flow diagram of a method for presenting on a search results page a plurality of preview videos that are played in succession without user intervention, in accordance with an embodiment of the present invention.

DETAILED DESCRIPTION

Figure 1:
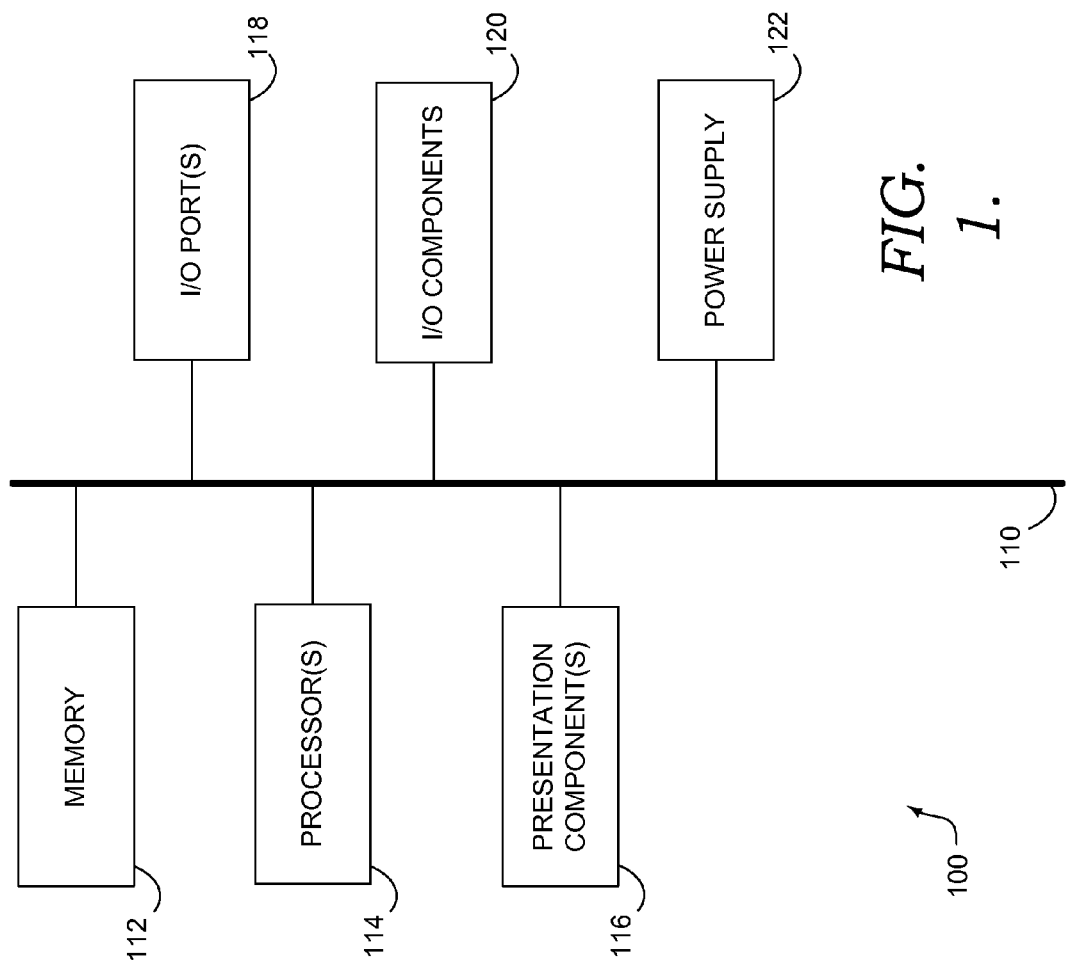
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods and computer-readable media for providing the user with a summary of various topics in the form of a video. The video may be comprised of several preview videos that are directed toward various categories, such as health, entertainment, sports, politics, science and technology, United States, world, etc. In one instance, the category may be broad, such as top stories, and may include one or more of the more specific categories, or subcategories, listed above. An informational item, such as a story, for either a single or multiple categories, may be determined such that a preview video for each may be selected. The subcategories, informational items, and preview videos may be determined in much the same way, in that they may be algorithmically determined based on one or more heuristics. Further, a ranking system may be used to make this determination which may indicate popularity, importance, reliability, or relevance subcategories, informational items, and preview videos. In some embodiments, related content, such as articles, images, other videos, or audio clips associated with a particular informational item may be displayed while the related preview is played, which allows the user easy access to other content.

Accordingly, in one aspect, one or more computer-readable media having computer-executable instructions embodied thereon, that when executed, cause a computing device to perform a method of presenting on a search results page a plurality of preview videos that have been algorithmically determined to be most relevant to various informational items and that are played in succession without user intervention, are provided. The method includes determining from a database a first informational item and a second informational item that have associated preview videos, and algorithmically determining a first preview video associated with the first informational item and a second preview video associated with the second informational item. The first and the second preview videos are determined by a ranking system. Further, the method includes communicating for display on the search results page a single video stream that includes at least the first and the second preview videos. The method additionally includes receiving an indication to initiate play of the single video stream.

In another aspect, a computer-implemented method that, when executed by a computing device, presents on a search results page a plurality of preview videos that have been algorithmically determined to be most relevant to various informational items and that are played in succession without user intervention, is provided. The method includes receiving a selection of a search category, and based on the search category, determining a first informational item and a second informational item. Further, the method includes algorithmically determining a first preview video associated with the first informational item and a second preview video associated with the second informational item. The first and the second preview videos are determined by a ranking system. The method also includes communicating for display on the search results page the first and the second preview videos, and initiating play of the first preview video. Related content associated with the first preview video is displayed while the first preview video is played. Upon completion of the first preview video, the method includes initiating play of the second preview video without user intervention. The related content associated with the second preview video is displayed while the second preview video is played.

In yet another aspect, one or more computer-readable media having computer-executable instructions embodied thereon, that when executed, cause a computing device to perform a method of presenting on a search results page a plurality of preview videos that have been algorithmically determined to be most relevant to various informational items and that are played in succession without user intervention, are provided. The method includes receiving a selection of a search category on a search page, and algorithmically determining a first preview video and a second preview video that correspond to the selected search category. The first and the second preview videos correspond to a first informational item and a second informational item that have been algorithmically determined to be most relevant to the selected search category. Further, the method includes communicating for display on the search results page the first and the second preview videos and selecting from a database related content associated with each of the first and the second preview videos. The related content includes one or more of an article, a thumbnail video, an image, or an audio clip. The method additionally includes initiating play of the first preview video during which the related content associated with the first preview video is displayed, and upon completion of the first preview video, automatically initiating play of the second preview video during which the related content associated with the second preview video is displayed.

Having briefly described an overview of the present invention, an exemplary operating environment in which various aspects of the present invention may be implemented is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including handheld devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventor hereof recognizes that such is the nature of the art and reiterates that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer-storage media and communication media. Computer-storage media include both volatile and nonvolatile, removable and non-removable media implemented in any method or technology for storage of information such as computer-readable instructions, data structures, program modules or other data. Computer-storage media include, but are not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 100.

The memory 112 includes computer-storage media in the form of volatile and/or nonvolatile memory. The memory 112 may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 presents data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components 120 include a microphone, joystick, game pad, satellite dish, scanner, printer, wireless device, and the like.

Figure 2:
FIG. 2 is an illustrative screen display of a search results page having a single video stream that includes a plurality of preview videos, in accordance with an embodiment of the present invention.

Referring now to FIG. 2, an illustrative screen display 200 of a search results page is shown having a single video stream that includes a plurality of preview videos, in accordance with an embodiment of the present invention. Initially, a search box is illustrated at 210, and may be used by a user to enter a query. Embodiments of the present invention, however, do not require a query to be inputted, as will become apparent. In the embodiment of FIG. 2, a user may select a category, such as a top stories category 212. Other categories, including world, United States, business, politics, entertainment, sports, science/technology, health, Olympics, etc., may be selectable such that a user may select any of the categories to search for more specific information in a particular category. In one instance, a category, such as the top stories category 212, may be a default category such that when a user enters a particular search engine's webpage, similar to that shown in FIG. 2, the top stories category 212 may already be selected and associated information may be displayed. Here, various informational items (e.g., news stories) from a variety of categories are illustrated. For instance, informational item 214 has been selected from the politics category, informational item 216 has been selected from the United States category, informational item 218 has been selected from the world category, informational item 220 has been selected from the entertainment category, informational item 222 has been selected from the sports category, and informational item 224 has been selected from the sci/tech category.

Item 226 illustrates a video module that includes a larger video display 238 and several smaller thumbnail videos, or individual preview videos 228, 230, 232, and 234. The larger video display 238 displays the preview videos 228, 230, 232, and 234. In one embodiment, the preview videos, although displayed within the video module 226, are played sequentially without user interaction in the larger video display 238. The user may make a selection to initiate play of the videos, such as, for example, a play button, such as item 240, or may select the larger video display 238 or even one of the preview videos 228, 230, 232, or 234, in order to initiate play of the larger video display 238, but the preview videos play sequentially without any user interaction. In another embodiment, once the user has entered the search website, such as that shown in FIG. 2, the larger video display 238 may begin to play without user interaction. If the user is not interested in viewing a particular video, the user may select a forward or backward button 240 to switch the preview video currently being played.

The preview videos may originate from a number of sources, such as any news source or other internet source. These sources may display videos on their own websites. Here, the search engine crawls various websites and collects information and content, such as articles, videos, audio clips, and images, for example, and indexes this information and content in a database. Similar content is indexed together, and may be indexed by keywords, metadata, etc., for retrieval at a later time. To match articles and videos, for example, metadata may be taken from the videos and matched with keywords from articles. While the length of each preview video may vary, in one embodiment, each preview video is 30 or fewer seconds in length. As such, if four preview videos are sequentially presented to the user, the user would view approximately 2 or fewer minutes of videos. A video contained in the database may be much longer, but may be reduced in length using an algorithmic approach, which assists in determining the most important portions of the video, and thus the video may be condensed to 30 seconds, for example. In one embodiment preview videos, after being edited and shortened from a full-length video, may be stored and indexed. However, in another embodiment, the full-length videos are stored and indexed, and are not edited and shortened until retrieved to be included on the search results page as part of the video sequence that plays the preview videos sequentially without user interaction.

With continued reference to FIG. 2, the categories or subcategories, informational items, and specific preview videos that are selected may be algorithmically determined. For instance, if the selected category is top stories 212, as shown in FIG. 2, various subcategories, such as world, United States, business, politics, entertainment, sports, sci/tech, and health may be selected as the categories shown in the video module 226. These subcategories may be selected based on a variety of heuristics. For instance, these heuristics may include the amount of content that has been indexed on the same topic (e.g., number of articles for a given subject or topic), a rate at which the amount of content is increasing for the same topic, whether there are images and videos for a topic, the reputability of news sources who have authored the articles and videos, and the like. These heuristics are given merely as examples, and others are contemplated to be within the scope of the present invention. For instance, in one embodiment, even if the five most popular news stories at the moment are based on the same topic, such as government spending, the algorithm applied may determine that only one of these should be presented as a preview video, and other news stories, even though they may not be in the top five at the moment, should be presented. This forces diversity as to the news stories or informational items such that the user is given a diversified view of current topics, as opposed to several news stories or informational items from the same category.

Once the category or subcategories (e.g., such as for the category of top stories) have been determined, the informational items (e.g., news stories) are then selected. Once selected, the actual videos that are played for the user in a sequential format (e.g., without user intervention) may then be determined. The informational items and videos are selected in much the same way as the categories, which are described above. As mentioned, the videos are stored and indexed such that once a user visits a search website such as that shown in FIG. 2, the videos that are displayed on the search website may be algorithmically determined. For instance, all of the content that has been crawled and that is stored and indexed in the database is analyzed using a variety of heuristics. These heuristics may vary, but may generally provide an indication of popularity, importance, reliability, or relevance of a specific preview video or informational item. Heuristics that may be used for determining the informational items, may include, for exemplary purposes only, the rate at which the quantity of content associated with the informational item is increasing, the reputability of sources associated with the content, user interest in the informational items, etc. The heuristics that may be used for determining the videos may include the reputability of each source associated with the videos, user ratings of the videos, when the videos were created, etc.

The heuristics, as described above in relation to determining the subcategories and the preview videos, may be used, in one embodiment, as a basis for a ranking system that ranks the subcategories and preview videos, which ultimately assists in determining which to choose. For instance, the heuristics listed above for determining the preview videos to present to the user for each category or subcategory may give way to a rank. Each video or preview video indexed in a particular topic may be ranked, or only the top few (e.g., five, ten, twenty) videos may be ranked, depending on the embodiment. In some embodiments, each video or preview video that is indexed may be ranked, and only the top ranked videos or preview videos (e.g., the top ten ranked videos) are selected for presentation. A ranking system may only be used in certain embodiments, and may not be used in each embodiment contemplated in the present invention.

In one embodiment, the preview videos may be stitched or combined together to form a single file having a plurality of preview videos that are sequentially played one after the other. In another embodiment, however, each preview video is its own file, but the preview videos are sequentially played such that the user may feel that the videos are contained in a single file. In either embodiment, the videos are sequentially played in rapid succession. Further, as shown in FIG. 2, a separate video display, such as the larger video display 238, may be used to present the rapid succession of preview videos, but this is but one example. Other methods for displaying the videos will become apparent.

Figure 3:
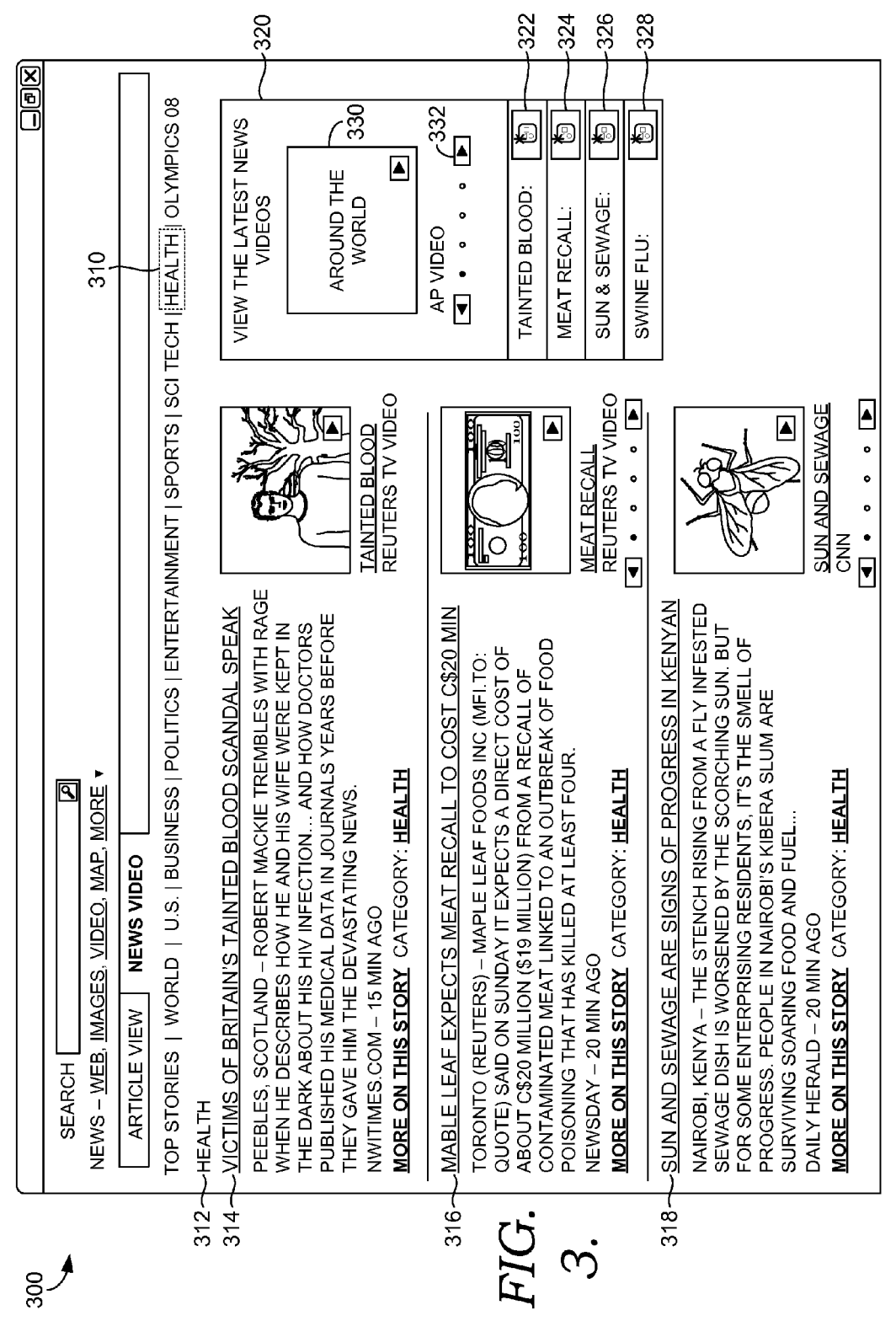

FIG. 3 is an illustrative screen display 300 of a search results page having a single video stream that includes a plurality of preview videos, in accordance with another embodiment of the present invention. Initially, a category may be selected by a user, such as the health category 310. Unlike the category of top stories shown in FIG. 2, which provides for a selection of informational items from different subcategories, when a specific category, such as the health category 310, is selected, only informational items related to that category may be displayed on the search page. Here, the health heading 312 on the search page indicates that the informational items located below are directed toward the health category. The informational items include items 314, 316, and 318. Video module 320 includes several preview videos, including preview videos 322, 324, 326, and 328. The individual informational items associated with the preview videos 322, 324, 326, and 328, and the preview videos themselves, may be algorithmically determined as described above in relation to FIG. 2.

A plurality of videos are stored and indexed such that once a user visits a search website, such as that shown in FIG. 3, the videos that are displayed on the search website may be algorithmically determined. For instance, all of the content that has been crawled and that has been stored and indexed in the database may be analyzed using a variety of heuristics. These heuristics may vary, but for determining the informational items, the heuristics may include, for exemplary purposes only, the rate at which the quantity of content associated with the informational item is increasing, the reputability of sources associated with the content, user interest in the informational items, etc. The heuristics that may be used for determining the videos may include the reputability of each source associated with the videos, user ratings of the videos, when the videos were created, etc. In one embodiment, the preview videos are formed (e.g., edited as to present only the most important portions of the video in a shorter time frame) after the video that will be displayed has been selected. In other embodiments, however, preview videos are formed prior to being selected, and may be stored in the preview video format in the database. For instance, preview videos may be created from full videos and stored in an index at crawl time, such that a preview video is available for all videos that have been crawled and indexed. Further, the preview videos may be of any length, such as, for example, fifteen seconds, thirty seconds, one minute, etc. In one embodiment, the preview videos are limited to a maximum length of 30 seconds.

The heuristics, as described above in relation to determining the informational items and the videos, may be used, in one embodiment, as a basis for a ranking system that ranks the informational items and videos, which ultimately assists in determining which to choose for inclusion in the video display that sequentially plays the preview videos without user interaction. For instance, the heuristics listed above for determining the videos to present to the user for the selected category may give way to a rank. Each video or preview video indexed in a particular topic may be ranked, or only the top few (e.g., five, ten, twenty) videos may be ranked, depending on the embodiment. In some embodiments, each video or preview video that is indexed may be ranked, and only the top ranked videos or preview videos (e.g., the top ten ranked videos) are selected for presentation. A ranking system may only be used in certain embodiments, and may not be used in each embodiment contemplated in the present invention.

In addition to the preview videos 322, 324, 326, and 328, the video module 320 of FIG. 3 also includes a larger video display 330 and various buttons 332 that allow the user to control the play of the video. The larger video display 330 in this embodiment presents each of the preview videos sequentially without the need for the user to select each preview video. The videos are played in rapid sequence to give the user an overview of that moment's top stories in the selected category. In one embodiment, once the user enters the search page, such as that shown in FIG. 3, the video that sequentially plays the preview videos may begin to play without user interaction, but in another embodiment, a user may be required to select a play or a similar button to begin the video. This video may be a single video file that has combined each of the preview videos, or it may simply play each preview video sequentially, and not be a single video file. Either way, the user may not notice the difference, as either way, it may appear that the preview videos are played sequentially.

Figure 4:
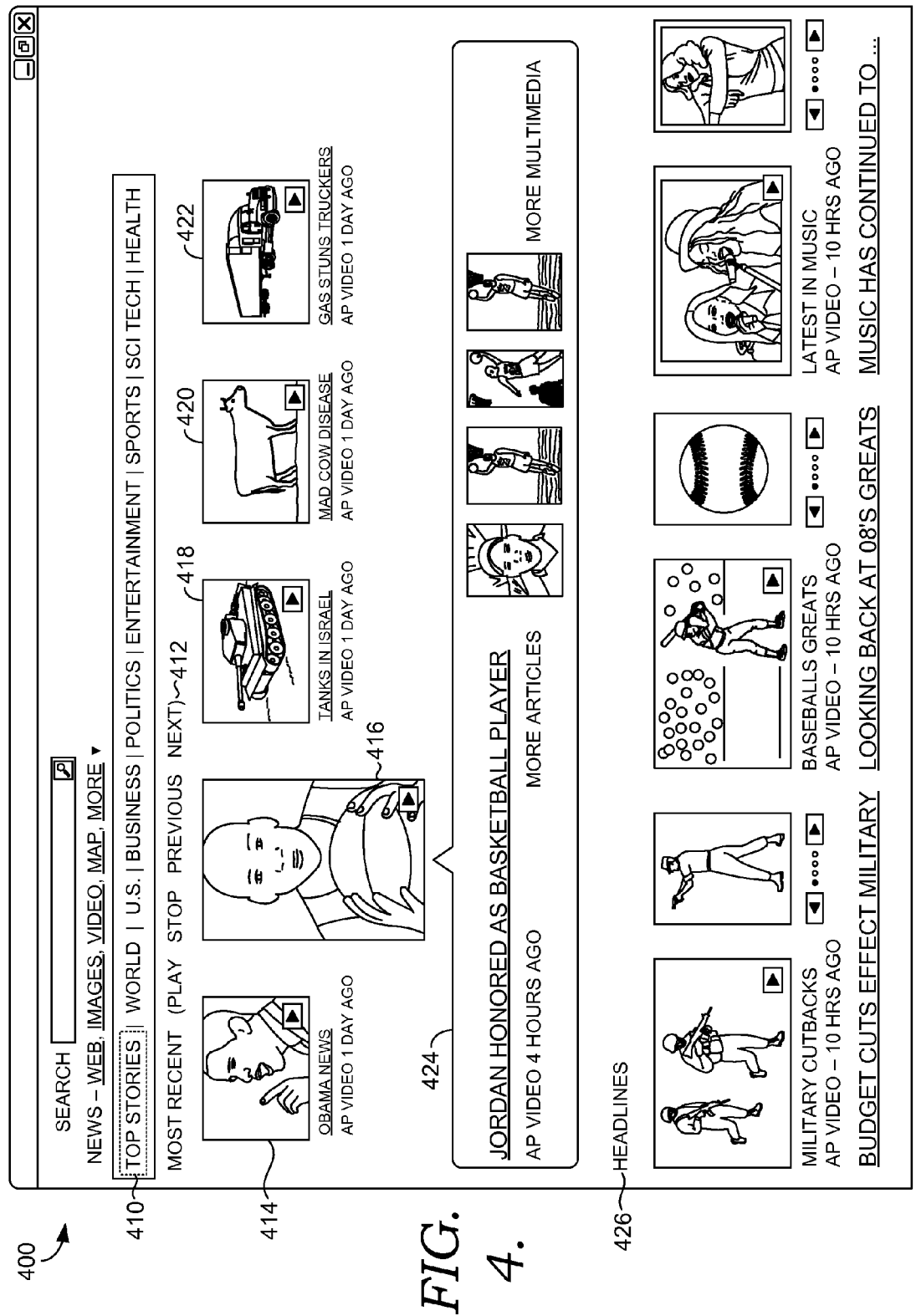
FIG. 4 is an illustrative screen display of a search results page that includes a plurality of preview videos and related content associated with the preview video that is currently playing, in accordance with another embodiment of the present invention.

Turning to FIG. 4, an illustrative screen display 400 of a search results page is shown that includes a plurality of preview videos and related content associated with the preview video that is currently playing, in accordance with another embodiment of the present invention. Initially, the top stories category 410 is shown as being highlighted or having a surrounding border, thus indicating that it is the category that has been selected by a user, or that it is the default category that is selected when the user enters the search page. The embodiment of FIG. 4 functions much the same as that described and illustrated in the embodiments of FIGS. 2 and 3. Here, however, the buttons or links that are selectable by a user are shown at item 412. This allows a user to initiate the play of the preview videos and also allows for the user to stop the play, or go to a previous or a next preview video. Various preview videos are displayed, such as preview videos 414, 416, 418, 420, and 422. Each preview video, as shown, includes a title of the preview that may be underlined, as shown, and may also include the source of the video or article.

Unlike the embodiments of FIGS. 2 and 3, the embodiment of FIG. 4 does not include a separate video display that separately displays each preview video as it is being played, such as the larger video displays 238 and 330 of FIGS. 2 and 3, respectively. Alternatively, here, as each preview is being played, the preview thumbnail is enlarged such that it is obvious to the user which is being played at the current moment. For example, preview video 416 is larger than the other thumbnails of preview videos 414, 418, 420, and 422. Thus, preview video 416 is the video currently played for the user. Once the preview video 416 is completed, the next thumbnail of a preview video, such as preview video 418, may become larger and, without requiring user interaction, may initiate play.

Another aspect of FIG. 4 is that related content associated with each preview video is displayed on the search page throughout the duration of play of each preview video. For instance, here, related content 424 is included in a separate box and is associated with the preview video 416 that is currently playing. Related content may include articles, images, other videos, audio, etc., that are associated with the currently playing preview video. Further, links to more related content, such as more articles and more multimedia may also be included in the related content 424. The related content may be selected in much the same way as described above in relation to the categories and subcategories, informational items, and preview videos. For instance, the related content associated with the preview videos may be algorithmically determined using various heuristics, such as user ratings associated with the related content, number of clicks or selections on the related content (e.g., each image, article), reputability of the source, etc. Thus, if there are hundreds of articles relating to Jordan being honored as a top basketball player, for example, the one selected may be the most popular, as indicated by user ratings or user selections of the article.

Other portions of the search page may include headlines 426, such as various other informational items that were not selected to display their associated preview videos, but may be important news stories, for example, at that moment. These informational items may have videos or preview videos associated with them, as shown in FIG. 4, but these preview videos may not be ones that are sequentially played without user intervention, such as the preview videos 414, 416, 418, 420, and 422.

Figure 5:
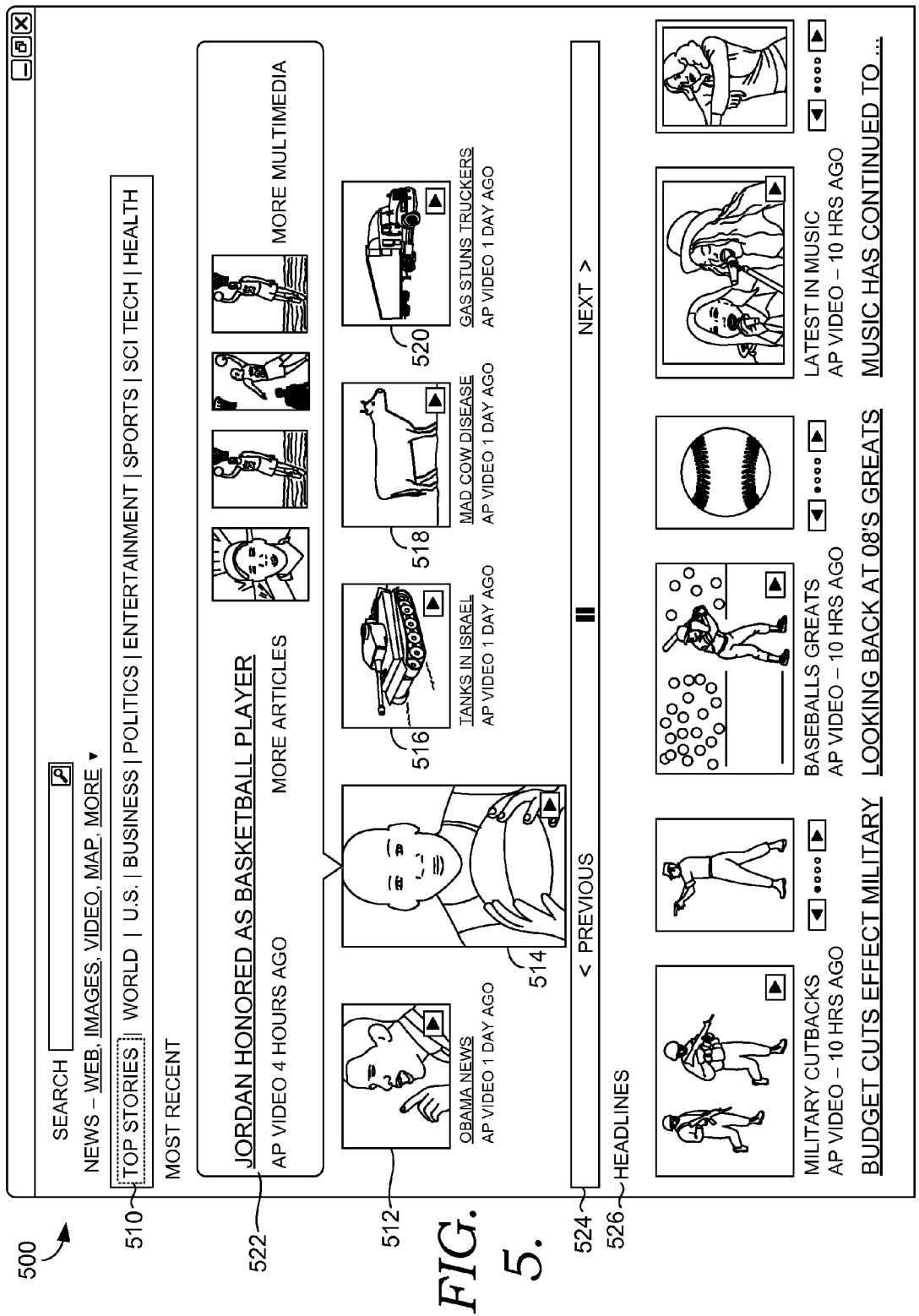
FIG. 5 is an illustrative screen display of a search results page that includes a plurality of preview videos and related content associated with the preview video that is currently playing, in accordance with another embodiment of the present invention.

FIG. 5 is an illustrative screen display 500 of a search results page that includes a plurality of preview videos and related content associated with the preview video that is currently playing, in accordance with another embodiment of the present invention. The embodiment of FIG. 5 is similar to that of FIG. 4. For example, the category top stories 510 has been selected (e.g., selected by a user, the default selection when the user enters the search page), and various preview videos 512, 514, 516, 518, and 520 are displayed for sequential play without user interaction. Additionally, as each preview video is played, the thumbnail representing the preview video is enlarged to indicate that it is currently being played. Related content 522 associated with the preview video currently being played is also provided, which allows the user access to articles, images, more videos, audio, and links to more articles and multimedia, as shown in the box containing the related content 522. The related content may be selected as described above in relation to FIG. 4. Further, a separate video display, such as is used in the embodiments of FIGS. 2 and 3, is not utilized in the embodiment of FIG. 5. Alternatively, each preview video, while being played, draws the user's attention to that preview video in some fashion, such as being enlarged in size to indicate to the user which preview video is currently being played. Other ways to bring this to the user's attention may be to have a special border around the preview video, highlighting the preview video, etc.

Controllers 524 allow the user to pause the play of the preview videos, or to watch a previous or a next preview video. While the controllers 524 are available, they may not be needed, as the preview videos may play in rapid succession without user intervention. Additionally, the headlines 526 that may be most popular or important at a particular moment may also be displayed on the search page. Articles, as well as associated videos or preview videos, may be displayed, as shown in FIG. 5. These preview videos, however, may not be included in the group of preview videos that are played in rapid succession without user intervention.

Referring now to FIG. 6, a flow diagram of a method 600 is illustrated for presenting on a search results page a single video stream that includes a plurality of preview videos, in accordance with an embodiment of the present invention. Initially, a first informational item and a second informational item are determined from a database, shown at step 610. The informational items have associated preview videos that may be selected to be displayed on a search page. The informational items are any type of information, such as a news story (e.g., entertainment information, health information, sports information, politics information, world information, technology or science information) that may be conveyed to a user via a search page. This may include an article, for example, written by a writer for a particular newspaper, online journal, magazine, or the like. In one embodiment, the first and second informational items are selected from different categories (e.g., world, United States, business, politics, entertainment, sports, science/technology, health), but in another embodiment, the first and second informational items are selected from the same category, such as when a user selects a particular category on a search page, indicating that the user wishes to only view informational items from that particular category.

Informational items may be determined algorithmically, which has been previously described. This determination, for example, may be based on one or more heuristics, such as the popularity of a certain informational item (e.g., number of times users have selected a particular article or video), a quantity of related content associated with the informational items, a rate at which the quantity of related content is growing, a reputability of a source that has authored the related content, a type of the related content, a rank assigned to the informational item, or the like. Once the first and second informational items have been determined, a first preview video associated with the first informational item and a second preview video associated with the second informational item are algorithmically determined at step 620. The preview videos that are ultimately selected may be algorithmically determined, as described herein, and may be based on a ranking system that ranks the preview videos. The ranking system ultimately assists in determining which preview videos to choose. For instance, the heuristics listed above that may be used to determine the preview videos to present to the user may give way to a rank. Each video or preview video indexed in a particular topic may be ranked, or only the top few (e.g., five, ten, twenty) videos may be ranked, depending on the embodiment. In some embodiments, each video or preview video that is indexed may be ranked, and only the top ranked videos or preview videos (e.g., the top ten ranked videos) are selected for presentation. A ranking system may only be used in certain embodiments, and may not be used in each embodiment contemplated in the present invention.

At step 630, a single video stream is communicated for display on the search results page. The single video stream may include at least the first and the second preview videos. In some embodiments, more than two preview videos are included. Each preview video, in one instance, may be a certain length of time, such as ten seconds, thirty seconds, one minute, etc. In one embodiment, the preview videos are limited to a maximum length of 30 seconds. Further, the preview videos may be edited and shortened from a longer, more detailed video at a certain time. For instance, the actual preview video may be indexed and stored in the database, or may be formed only after the associated video has been selected. The most relevant or important portions of a video may be algorithmically determined, and this may be how the first and second preview videos are formed. Additionally, even though a single video stream is displayed on the search results page, the individual preview videos, such as the first and the second preview videos, may also be displayed, which allows for the user to select the individual preview video if the user does not wish to watch the single video stream that continuously plays the preview videos without user interaction. In other embodiments, however, the individual preview videos, such as smaller thumbnail videos, may not be displayed on the search page along with the single video stream. The single video stream may be a single file containing each of the preview videos. Alternatively, the single video stream may simply play each of the preview videos separately, and thus the continuously played video may not be a single file. The user may not be able to distinguish between a single file and the single video stream playing separate files.

In one embodiment, related content associated with each preview video that is currently playing may be presented on the search page. The related content may include articles, other videos, images, and audio that are related to the preview video. An example of related content is illustrated as items 424 and 522 in FIGS. 4 and 5, respectively. An indication to initiate play of the single video stream is received at step 640. The indication may come from the user, such as the selection of a play button or the selection of one of the preview videos. These may initiate the play of the single video stream. Alternatively, the user entering the search page may initiate play of the single video stream, and the user may not have to make any further indications.

FIG. 7 is a flow diagram of a method 700 for presenting on a search results page a plurality of preview videos that are played in succession without user intervention, in accordance with an embodiment of the present invention. A selection of a search category is received at step 710. The search categories may include, for exemplary purposes only, world, United States, business, politics, entertainment, sports, science/technology, health, Olympics '08. Many others are contemplated to be within the scope of the present invention. In one instance, the user may not select the search category, but a default may be used, such as the top stories search category. If a search category of top stories, for example is selected or is the default category, subcategories may be selected from which informational items are determined.

Based on the selected search category, a first and a second informational item are determined at step 720. As discussed herein, the informational items may be algorithmically determined based on a plurality of heuristics, such as the popularity of a certain informational item (e.g., number of times users have selected a particular article or video), a quantity of related content associated with the informational items, a rate at which the quantity of related content is growing, a reputability or reliability of a source that has authored the related content, a type of the related content, a rank assigned to the informational item, or the like. In one embodiment, the first and the second informational items are from different subcategories.

At step 730, a first preview video associated with the first informational item and a second preview video associated with the second informational item are algorithmically determined. When various documents, videos, etc., are crawled by a search engine, the first informational item may be associated with the first preview video and may be stored and indexed together in a database. The first and second preview videos may be determined by a ranking system. The ranking system ultimately assists in determining which preview videos to choose based, for instance, on one or more of the heuristics listed above. Each video or preview video indexed in a particular topic may be ranked, or only the top few (e.g., five, ten, twenty) videos may be ranked, depending on the embodiment. In some embodiments, each video or preview video that is indexed may be ranked, and only the top ranked videos or preview videos (e.g., the top ten ranked videos) are selected for presentation. A ranking system may only be used in certain embodiments, and may not be used in each embodiment contemplated in the present invention.

The first and the second preview videos are communicated for display on the search results page at step 740. At step 750, the first preview video is initiated for play, wherein related content associated with the first preview video is displayed while the first preview video is played. Related content may include, for example, articles, videos, images, and audio clips. The related content may be selected in much the same way as described above in relation to the categories and subcategories, informational items, and preview videos. For instance, the related content associated with the preview videos may be algorithmically determined using various heuristics, such as user ratings associated with the related content, number of clicks or selections on the related content (e.g., each image, article), reputability of the source, etc. Thus, if there are hundreds of articles relating to Jordan being honored as a top basketball player, for example, the one selected may be the most popular, as indicated by user ratings or user selections of the article. At step 760, upon completion of the first preview video, play of the second preview video is initiated without user intervention or interaction, such that the related content associated with the second preview video is displayed while the second preview video is played.

Other embodiments may include more than a first and a second informational item. For example, a third informational item may be determined, followed by the algorithmic determination of a third preview video that is associated with the third informational item. The third preview video may then be communicated for display on the search results page along with the first and the second preview videos. Upon completion of the second preview video, the play of the third preview video is initiated without user intervention. The related content associated with the third preview video is displayed while the third preview video is played.

Figure 8:
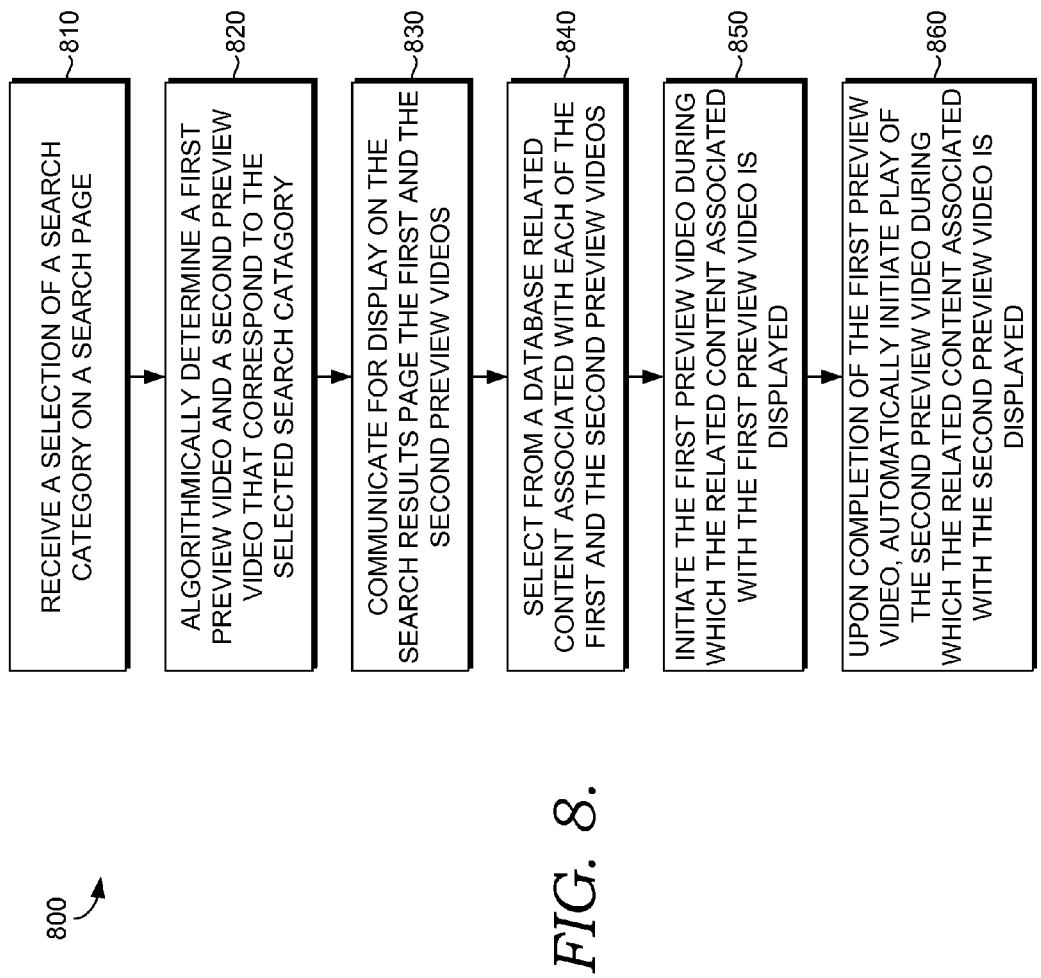
FIG. 8 is a flow diagram of a method for presenting on a search results page a plurality of preview videos that are played in succession without user intervention and related content, in accordance with an embodiment of the present invention.

Turning to FIG. 8, a flow diagram of a method 800 is shown for presenting on a search results page a plurality of preview videos that are played in succession without user intervention and related content, in accordance with an embodiment of the present invention. Initially, a selection of a search category on a search page is received at step 810. The search categories may include, for exemplary purposes only, world, United States, business, politics, entertainment, sports, science/technology, health, Olympics '08, although many others are contemplated to be within the scope of the present invention.

At step 820, a first preview video and a second preview video are algorithmically determined. These preview videos correspond to the selected search category, and further, the first preview video corresponds to a first informational item and the second preview item corresponds to a second informational item, both of which have been algorithmically determined to be most relevant to the selected search category. Both the preview videos and informational items may be algorithmically determined based on a plurality of heuristics, which is described above. Further, the informational items and the preview videos may be determined based on a ranking system, and the ranking system may be based on the heuristics that are discussed herein. These may include, for example, a quantity of the related content associated with the informational items, a rate at which the quantity of related content is growing, the reputability of the sources that have authored the related content, or a type of the related content, such as articles, videos, audio clips, images, etc. The first and second preview videos are communicated for display on the search results page, as indicated by step 830.

Related content associated with each of the first and the second preview videos, and thus with the first and second informational items, are selected from a database at step 840. The related content includes one or more of an article, a video, an image, or an audio clip, and may be algorithmically determined based on one or more of relevance or popularity. The process for selecting the related content is described above. As the first preview video is initiated and played, the related content associated with the first preview video is displayed, which is shown at step 850. Further, at step 860, upon completion of the first preview video, play of the second preview video is automatically initiated (e.g., without user intervention), during which related content associated with the second preview video is displayed. In one embodiment, more than two preview videos are selected, and therefore a third, at least, preview video may be displayed to the user and is played in rapid succession after the second preview video, without user interaction.

The foregoing descriptions of embodiments of the invention are illustrative, and modifications in configuration and implementation will occur to persons skilled in the art. For instance, while the present invention has generally been described with relation to FIGS. 1-8, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

What is claimed is:

1. One or more computer-readable storage media having computer-executable instructions embodied thereon, that when executed, cause a computing device to perform a method of presenting on a search results page a plurality of preview videos that have been algorithmically determined to be most relevant to various informational items and that are played in succession without user intervention, the method comprising:

determining from a database a first informational item and a second informational item that have associated preview videos;

algorithmically determining a first video associated with the first informational item and a second video associated with the second informational item, wherein the first and the second videos are determined by a ranking system;

algorithmically extracting a first important portion of the first video to form a first preview video and a second important portion of the second video to form a second preview video;

combining the first preview video and the second preview video into a single video file such that the second preview video is sequentially played after the first preview video has been played;

communicating for display on the search results page the first informational item and the second informational item and the single video file that includes at least the first and the second preview videos;

determining a first set of related content associated with the first preview video, wherein the first set of related content is different from the first informational item and the first preview video;

determining a second set of related content associated with the second preview video, wherein the second set of related content is different from the second informational item and the second preview video;

receiving an indication to initiate play of the single video file: and upon receiving the indication to initiate play of the single video file, automatically and sequentially displaying the first set of related content and the second set of related content such that:

(1) only one set of related content is displayed at any one time, and (2) the first set of related content is displayed simultaneously with the first preview video and the second set of related content is displayed simultaneously with the second preview video.

2. The media of claim 1, wherein the first and second informational items are news stories.

3. The media of claim 1, wherein the first informational item and the second informational item are from different categories.

4. The media of claim 3, wherein the categories include one or more of top stories, world, United States, business, politics, entertainment, sports, science and technology, or health.

5. The media of claim 1, wherein the first and second informational items are algorithmically determined, and wherein the determination is based on the ranking system.

6. The media of claim 1, wherein the first and second set of related content include one or more of an article, a video, an image, or an audio clip.

7. The media of claim 1, wherein a ranking system based on a plurality of heuristics, including one or more of a quantity of the first and second set of related content associated with the first and second informational items, a rate at which the quantity of the first and second set of related content is growing, a reputability of a source that has authored the first and second set of related content, or a type of the first and second set of related content is utilized to determine the first and second set of related content.

8. The media of claim 1, further comprising separately displaying the first and the second preview videos on the search results page.

9. A computer-implemented method that, when executed by a computing device, presents on a search results page a plurality of preview videos that have been algorithmically determined to be most relevant to various informational items and that are played in succession without user intervention, the method comprising:

receiving a selection of a search category;
based on the search category, determining a first informational item and a second informational item;
algorithmically determining a first preview video associated with the first informational item and a second preview video associated with the second informational item, wherein the first and the second preview videos are determined by a ranking system;
algorithmically determining:
 (1) a first set of related content associated with the first preview video, the first set of related content being different from the first preview video and the first informational item, and
 (2) a second set of related content associated with the second preview video, the second set of related content being different from the second preview video and the second informational item;
communicating for display on the search results page the first and second informational items and the first and the second preview videos;
initiating play of the first preview video, wherein only the first set of related content associated with the first preview video is automatically displayed upon initiation of play of the first preview video; and
upon completion of the first preview video:
 (1) removing from display the first set of related content,
 (2) initiating play of the second preview video without user intervention, and
 (3) upon removing from display the first set of related content, displaying only the second set of related content associated with the second preview video upon initiation of play of the second preview video.

10. The method of claim 9, further comprising:
determining a third informational item;
algorithmically determining a third preview video associated with the third informational item;
algorithmically determining a third set of related content associated with the third preview video, the third set of related content being different from the third preview video and the third informational item;
communicating for display on the search results page the third preview video and the third informational item; and
upon completion of the second preview video:
 (1) removing from display the second set of related content,
 (2) initiating play of the third preview video without user intervention, and
 (3) upon removing from display the second set of related content, displaying only the third set of related content associated with the third preview video upon initiation of play of the third preview video.

11. The method of claim 9, wherein the first and second set of related content include one or more of an article, a thumbnail video, an image, or an audio clip.

12. The method of claim 9, further comprising:
associating the first informational item with the first preview video; and
storing the first informational item and the first preview video in a database.

13. The method of claim 9, wherein the search category includes one or more of top stories, world, United States, business, politics, entertainment, sports, science and technology, or health.

14. The method of claim 13, wherein the search category is the top stories and includes one or more subcategories including one or more of world, United States, business, politics, entertainment, sports, science and technology, or health.

15. The method of claim 14, wherein the first informational item is a different subcategory than the second informational item.

16. One or more computer-readable storage media having computer-executable instructions embodied thereon, that when executed, cause a computing device to perform a method of presenting on a search results page a plurality of news-related preview videos that have been algorithmically determined to be most relevant to various informational items and that are played in succession without user intervention, the method comprising:
receiving a selection of a search category on a search page;
algorithmically determining a first informational item and a second informational item that are relevant to the search category;
algorithmically determining a first news-related preview video corresponding to the first informational item and a second news-related preview video corresponding to the second informational item;
communicating for display on the search results page the first and the second news-related preview videos and the first and second informational items;
selecting from a database:
 (1) a first set of related content associated with the first news-related preview video, the first set of related content being different from the first informational item and the first news-related preview video,
 (2) a second set of related content associated with the second news-related preview video, the second set of related content being different from the second informational item and the second news-related preview video, and
 (3) wherein the first and the second set of related content include one or more of an article, a thumbnail video, an image, an audio clip, or a link to additional related content;
initiating play of the first news-related preview video during which only the first set of related content associated with the first news-related preview video is simultaneously and automatically displayed; and
upon completion of the first news-related preview video:
 (1) removing from display the first set of related content,
 (2) automatically initiating play of the second news-related preview video, and
 (3) upon removing from display the first set of related content, automatically and simultaneously displaying only the second set of related content associated with the second news-related preview video upon initiation of play of the second news-related preview video.

17. The media of claim 16, wherein the first and second set of related content selected from the database are algorithmically determined based on one or more of relevance or popularity.

18. The media of claim 16, wherein the first informational item, the second informational item, the first news-related preview video, and the second news-related preview video are algorithmically determined based on a ranking system, and wherein the ranking system is based on a plurality of heuristics, including one or more of a quantity of the related content associated with the first and second informational items, a rate at which the quantity of related content is growing, a reputability of a source that has authored the related content, or a type of the related content.

* * * * *